United States Patent [19]
Spethmann et al.

[11] Patent Number: 6,110,333
[45] Date of Patent: Aug. 29, 2000

[54] COMPOSITE MEMBRANE WITH HIGHLY CRYSTALLINE POROUS SUPPORT

[75] Inventors: Jeffrey E. Spethmann, Chalfont, Pa.; James Thomas Keating, Wilmington, Del.

[73] Assignees: E. I. du Pont de Nemours and Company, Wilmington, Del.; Donaldson & Co., Minneapolis, Minn.

[21] Appl. No.: 09/070,040

[22] Filed: Apr. 30, 1998

Related U.S. Application Data

[60] Provisional application No. 60/046,814, May 2, 1997.

[51] Int. Cl.⁷ ..................................................... C25B 9/10
[52] U.S. Cl. ........................... 204/252; 204/296; 429/30; 429/33
[58] Field of Search .................................. 204/296, 252; 429/33, 30

[56] References Cited

U.S. PATENT DOCUMENTS

| | | | |
|---|---|---|---|
| 3,282,875 | 11/1966 | Connolly et al. | 260/29.6 |
| 3,692,569 | 9/1972 | Grot | 117/138.8 |
| 3,953,566 | 4/1976 | Gore | 264/288 |
| 3,962,153 | 6/1976 | Gore | 260/2.5 R |
| 4,187,390 | 2/1980 | Gore | 174/102 R |
| 4,255,523 | 3/1981 | Ukibashi et al. | 521/27 |
| 4,358,545 | 11/1982 | Ezzell et al. | 521/27 |
| 4,433,082 | 2/1984 | Grot | 524/755 |
| 4,453,991 | 6/1984 | Grot | 156/94 |
| 4,552,631 | 11/1985 | Bissot et al. | 204/98 |
| 4,604,170 | 8/1986 | Miyake et al. | 204/98 |
| 4,849,311 | 7/1989 | Itoh et al. | 429/192 |
| 4,902,308 | 2/1990 | Mallouk et al. | 55/16 |
| 4,940,525 | 7/1990 | Ezzell et al. | 204/252 |
| 4,954,388 | 9/1990 | Mallouk et al. | 428/198 |
| 4,997,567 | 3/1991 | Messalem et al. | 210/490 |
| 5,082,472 | 1/1992 | Mallouk et al. | 55/16 |
| 5,094,895 | 3/1992 | Blanca et al. | 428/36.91 |
| 5,183,545 | 2/1993 | Branca et al. | 204/252 |
| 5,409,785 | 4/1995 | Nakano et al. | 429/33 |
| 5,447,636 | 9/1995 | Banerjee | 210/638 |
| 5,547,551 | 8/1996 | Bahar et al. | 204/296 |
| 5,599,614 | 2/1997 | Baher et al. | 204/296 |
| 5,635,041 | 6/1997 | Bahar et al. | 204/282 |

FOREIGN PATENT DOCUMENTS

| | | |
|---|---|---|
| 17506/88 | 4/1987 | Australia . |
| 0 718 903 A1 | 12/1995 | European Pat. Off. . |
| 51-71888 | 12/1974 | Japan . |
| JGP-66 | 9/1987 | Japan . |
| 1 286 589 | 3/1970 | United Kingdom . |
| 2 091 166 | 7/1982 | United Kingdom . |
| WO 96/28242 | 1/1996 | WIPO . |

OTHER PUBLICATIONS

Application No. 08/339,167 filed Nov. 10, 1994 and allowed Nov. 11, 1996, Fuel Cell Incorporating A Reinforced Membrane, Shoibal Banerjee inventor, DuPont Docket No. AD–6227.

IR Studies on Polytetrafluorethylene, J. Am. Chem. Soc. 81, 1045–1050, (1959), R. E. Moynihan No Month Available.

Thermal Characterization of Polymeric Materials, E.A. Turi, ed., Academic Press, New Uork 1981, ch. 1,3 No Month Available.

Composite Membranes for Fuel–Cell Applications, Robert F. Hill and Eric W. Schneider, Jan. 1992, vol. 38, No. 1.

*Primary Examiner*—Bruce F. Bell

[57] ABSTRACT

A composite membrane including an ion exchange polymer and a support of expanded polytetrafluoroethylene polymer having a porous microstructure of polymeric fibrils, said expanded polytetrafluoroethylene polymer being at least about 85% crystalline.

31 Claims, No Drawings

COMPOSITE MEMBRANE WITH HIGHLY CRYSTALLINE POROUS SUPPORT

RELATED APPLICATIONS

This application claims the benefit of U.S. Provisional Application No. 60/046,814, filed May 2, 1997.

FIELD OF INVENTION

This invention relates to composite membranes and more particularly to composite ion exchange membranes of highly fluorinated ion exchange polymers with porous support films of a highly fluorinated nonionic polymer.

BACKGROUND OF THE INVENTION

Ion exchange polymer membranes have found utility in a number of electrochemical and other processes. One use has been as membranes for solid polymer electrolyte cells. Solid polymer electrolyte cells typically employ a membrane of an ion exchange polymer which serves as a physical separator between the anode and cathode while also serving as an electrolyte. These cells can be operated as electrolytic cells for the production of chemical products or they may be operated as fuel cells for the production of electrical energy. Ion exchange polymer membranes are also used for facilitated transport, diffusion dialysis, electrodialysis, pervaporation and vapor permeation separations.

Polymer ion exchange membranes must have sufficient strength to be useful in these various applications. Membranes of highly fluorinated polymers such as perfluorinated sulfonic acid polymer membranes are particularly well-suited for use in such cells due to excellent chemical resistance, long life, and high conductivity. However, for some applications, the tensile strength of such membranes is not as high as desired. If increased physical strength is achieved by making the membrane thicker, a decrease in ionic conductance may result. Reinforcement are sometimes incorporated into the membranes to increase strength. For example, in membranes used in the chloralkali process, i.e., the production of caustic and chlorine by electrolytic conversion of an aqueous solution of an alkali metal chloride, woven reinforcements are incorporated into the membranes. For other applications such as in fuel cells, increased tensile strength is typically not needed in use but may be desirable for ease of handling or for certain manufacturing operations involving the membranes.

Reinforcement of polymer ion exchange membranes to confer improved physical properties has been disclosed in a number of prior art references. A number of references disclose combining porous expanded polytetrafluoroethylene (EPTFE) with highly fluorinated ion exchange polymer. For example, in U.S. Pat. No. 3,692,569 (Grot), surface active fluorocarbon objects are described as a composite structure of an inert fluorocarbon polymer core with a chemically modified fluorocarbon copolymer surface which confers chemical activity to the structure. Exemplified is a fluorocarbon core which is a porous support film of polytetrafluoroethylene and which is coated with a fluorocarbon copolymer with pendant chemically active sulfonyl groups. The coating copolymer either forms a coating in the pores or fills the pores depending on the desired use of the structure.

U.S. Pat. No. 4,902,308 (Mallouk et al.) describes a sheet of porous expanded polytetrafluoroethylene coated with a reactive metal salt of perfluorinated ion exchange polymer for use in scavenging unwanted gas components.

U.S. Pat. No. 5,082,472 (Mallouk et al.) discloses a dimensionally stable composite membrane for use in facilitated transport unit operations. The composite is described as a porous expanded polytetrafluoroethylene in laminar contact with a continuous perfluorinated ion exchange resin layer, the ion exchange layer being swollen with a hydrophilic liquid.

U.S. Pat. No. 4,954,388 (Mallouk et al.) discloses an abrasion-resistant, tear resistant, multilayer composite membrane for use in electrolysis. The composite membrane is described as having a perfluorinated ion exchange layer attached to a reinforcing fabric by means of an interlayer of porous expanded polytetrafluoroethylene.

U.S. Pat. No. 5,547,551 (Bahar et al.) discloses an ultra-thin composite membrane of porous expanded polytetrafluoroethylene impregnated with ion exchange polymer. The base material is defined by a thickness of less than 1 mil (0.025 mm) with the ion exchange resin impregnating the membrane such that the membrane is essentially air impermeable.

The process for producing porous expanded polytetrafluoroethylene support films used in reinforcing ion exchange membrane is described in U.S. Pat. Nos. 3,953,566 and 3,962,153 (both to Gore). The references teach a method of rapidly stretching a paste-formed film of highly crystalline PTFE and then heat treating (or sintering) it to increase the amorphous content of the PTFE to typically greater than 10%. The resultant structure is expanded, amorphous-locked polytetrafluoroethylene film having a porous microstructure of polymeric fibrils which is easily bonded to other materials.

Although the prior art has shown ways of strengthening ion exchange membranes by reinforcement porous expanded PTFE supports, tear strength has not been as high as is desirable. A composite membrane is needed for application in electrochemical processes which possesses greater tear strength without sacrificing performance.

SUMMARY OF THE INVENTION

The invention provides for a composite membrane comprising an ion exchange polymer and a support of expanded polytetrafluoroethylene polymer having a porous microstructure of polymeric fibrils, the expanded polytetrafluoroethylene polymer being at least about 85% crystalline.

In a preferred form of the invention, the ion exchange polymer is highly fluorinated and preferably the ion exchange groups are sulfonate groups.

In a preferred form of the invention the composite membrane has a wet tear strength as determined by ASTM D1922 of at least about 10 kN/m, preferably at least about 100 kN/m and more preferably at least about 200 kN/m.

In a preferred form of the invention the ion exchange polymer of the composite membrane has an ion exchange ratio of about 8 to about 23, preferably 9 to about 14, and more preferably about 10 to 13.

If desired, the composite membrane has fabric attached to the porous support and has particular use in chloralkali processes.

If desired, the porous support is fully embedded in the ion exchange polymer and the nonionic polymer of porous support comprises less than about 15% by weight of the membrane and the resulting composite membrane has particular use in fuel cell applications.

In accordance with a preferred form of the present invention, a composite membrane is provided which includes a highly fluorinated ion exchange polymer and a porous support consisting essentially of expanded highly fluorinated nonionic polymer having a porous microstructure of polymeric fibrils. The membrane has a wet tear strength as determined by ASTM D1922 of at least about 10 kN/m, preferably at least about 100 kN/m, and most preferably at least about 200 kN/m.

The composite membrane of the invention is advantageously employed in an electrochemical cell comprising an anode and a cathode partitioned by the composite membrane. The electrochemical cell preferably is operated as a fuel cell or operated to produce an alkali metal hydroxide and chlorine by the electrolytic conversion of an alkali metal chloride.

DETAILED DESCRIPTION
Ion Exchange Polymers

Polymers for use in accordance with this invention may be any number of ion exchange polymers including polymers with cation exchange groups that are preferably selected from the group consisting of sulfonate, carboxylate, phosphonate, imide, sulfonimide and sulfonamide groups. Various known cation exchange polymers can be used including polymers and copolymers of trifluoroethylene, tetrafluoroethylene, styrene-divinyl benzene, $\alpha,\beta,\beta$-trifluorstyrene, etc., in which cation exchange groups have been introduced.

Polymers for use in accordance with the present invention are preferably highly fluorinated ion-exchange polymers having sulfonate ion exchange groups. "Highly fluorinated" means that at least 90% of the total number of univalent atoms in the polymer are fluorine atoms. Most preferably, the polymer is perfluorinated. The term "sulfonate ion exchange groups" is intended to refer to either to sulfonic acid groups or salts of sulfonic acid groups, preferably alkali metal or ammonium salts. Most preferably, the ion exchange groups are represented by the formula —$SO_3X$ wherein X is H, Li, Na, K or $N(R^1)(R^2)(R^3)(R^4)$ and $R^1$, $R^2$, $R^3$, and $R^4$ are the same or different and are H, $CH_3$ or $C_2H_5$. For applications where the polymer is to be used for proton exchange, the sulfonic acid form of the polymer is preferred, i.e., where X is H in the formula above. For use in the chloralkali process, the sodium salt form of the polymer is preferred, i.e., where X is Na in the formula above.

Preferably, the polymer comprises a polymer backbone with recurring side chains attached to the backbone with the side chains carrying the cation exchange groups. Possible polymers include homopolymers or copolymers of two or more monomers. Copolymers are typically formed from one monomer which is a nonfunctional monomer and which provides carbon atoms for the polymer backbone. A second monomer provides both carbon atoms for the polymer backbone and also contributes the side chain carrying the cation exchange group or its precursor, e.g., a sulfonyl halide group such a sulfonyl fluoride (—$SO_2F$), which can be subsequently hydrolyzed to a sulfonate ion exchange group. For example, copolymers of a first fluorinated vinyl monomer together with a second fluorinated vinyl monomer having a sulfonyl fluoride group (—$SO_2F$) can be used. Possible first monomers include tetrafluoroethylene (TFE), hexafluoropropylene, vinyl fluoride, vinylidine fluoride, trifluorethylene, chlorotrifluoroethylene, perfluoro (alkyl vinyl ether), and mixtures thereof. Possible second monomers include a variety of fluorinated vinyl ethers with sulfonate ion exchange groups or precursor groups which can provide the desired side chain in the polymer. The first monomer may also have a side chain which does not interfere with the ion exchange function of the sulfonate ion exchange group. Additional monomers can also be incorporated into these polymers if desired.

A class of preferred polymers for use in the present invention includes a highly fluorinated, most preferably perfluorinated, carbon backbone and the side chain is represented by the formula —$(O—CF_2CFR_f)_a$—O—$CF_2CFR'_fSO_3X$, wherein $R_f$ and $R'_f$ are independently selected from F, Cl or a perfluorinated alkyl group having 1 to 10 carbon atoms, a=0, 1 or 2, and X is H, Li, Na, K or $N(R^1)(R^2)(R^3)(R^4)$ and $R^1$, $R^2$, $R^3$, and $R^4$ are the same or different and are H, $CH_3$ or $C_2H_5$. The preferred polymers include, for example, polymers disclosed in U.S. Pat. No. 3,282,875 and in U.S. Pat. Nos. 4,358,545 and 4,940,525. One preferred polymer comprises a perfluorocarbon backbone and the side chain is represented by the formula —O—$CF_2CF(CF_3)$—O—$CF_2CF_2SO_3X$, wherein X is as defined above. Polymers of this type are disclosed in U.S. Pat. No. 3,282,875 and can be made by copolymerization of tetrafluoroethylene (TFE) and the perfluorinated vinyl ether $CF_2$=CF—O—$CF_2CF(CF_3)$—O—$CF_2CF_2SO_2F$, perfluoro (3,6-dioxa-4-methyl-7-octenesulfonyl fluoride) (PDMOF), followed by conversion to sulfonate groups by hydrolysis of the sulfonyl halide groups and ion exchanging if needed to convert to the desired form. One preferred polymer of the type disclosed in U.S. Pat. Nos. 4,358,545 and 4,940,525 has the side chain —O—$CF_2CF_2SO_3X$, wherein X is as defined above. This polymer can be made by copolymerization of tetrafluoroethylene (TFE) and the perfluorinated vinyl ether $CF_2$=CF—O—$CF_2CF_2SO_2F$, perfluoro(3-oxa-4-pentenesulfonyl fluoride) (POPF), followed by hydrolysis and ion exchange if needed.

In preferred forms of the present invention, highly fluorinated carboxylate polymer, i.e., having carboxylate ion exchange groups in the resulting composite membrane, is also employed as will be discussed in more detail hereinafter. The term "carboxylate ion exchange groups" is intended to refer to either carboxylic acid groups or salts of carboxylic acid groups, preferably alkali metal or ammonium salts. Most preferably, the ion exchange groups are represented by the formula —$CO_2X$ wherein X is H, Li, Na, K or $N(R^1)(R^2)(R^3)(R^4)$ and $R^1$, $R^2$, $R^3$, and $R^4$ are the same or different and are H, $CH_3$ or $C_2H_5$. For use in the chloralkali process, the sodium salt form of the polymer is preferred, i.e., where X is Na in the formula above. Preferably, the polymer comprises a polymer backbone with recurring side chains attached to the backbone with the side chains carrying the carboxylate ion exchange groups. Polymers of this type are disclosed in U.S. Pat. No. 4,552,631 and most preferably have the side chain —O—$CF_2CF(CF_3)$—O—$CF_2CF_2CO_2X$. This polymer can be made by copolymerization of tetrafluoroethylene (TFE) and the perfluorinated vinyl ether $CF_2$=CF—O—$CF_2CF(CF_3)$—O—$CF_2CF_2CO_2CH_3$, methyl ester of perfluoro(4,7-dioxa-5-methyl-8-nonenecarboxylic acid) (PDMNM), followed by conversion to carboxylate groups by hydrolysis of the methyl carboxylate groups and ion exchanging if needed to convert to the desired form. While other esters can be used for film or bifilm fabrication, the methyl ester is the preferred since it is sufficiently stable during normal extrusion conditions.

In this application, "ion exchange ratio" or "IXR" is defined as number of carbon atoms in the polymer backbone in relation to the cation exchange groups. A wide range of IXR values for the polymer are possible. Typically, however, the IXR range used for layers of the laminated membrane is usually about 7 to about 33. For perfluorinated polymers of the type described above, the cation exchange capacity of a polymer is often expressed in terms of equivalent weight (EW). For the purposes of this application, equivalent weight (EW) is defined to be the weight of the polymer in acid form required to neutralize one equivalent of NaOH. In the case of a sulfonate polymer where the polymer comprises a perfluorocarbon backbone and the side chain is —O—CF$_2$—CF(CF$_3$)—O—CF$_2$—CF$_2$—SO$_3$H (or a salt thereof), the equivalent weight range which corresponds to an IXR of about 7 to about 33 is about 700 EW to about 2000 EW. IXR for this polymer can be related to equivalent weight using the following formula: 50 IXR+344=EW. While generally the same IXR range is used for sulfonate polymers disclosed in U.S. Pat. Nos. 4,358,545 and 4,940,525, the equivalent weight is somewhat lower because of the lower molecular weight of the monomer unit containing a cation exchange group. For the IXR range of about 7 to about 33, the corresponding equivalent weight range is about 500 EW to about 1800 EW. IXR for this polymer can be related to equivalent weight using the following formula: 50 IXR+178=EW. For carboxylate polymers having the side chain —O—CF$_2$CF(CF$_3$)—O—CF$_2$CF$_2$CO$_2$X, a useful IXR range is about 12 to about 21 which corresponds to about 900 EW to about 1350 EW. IXR for this polymer can be related to equivalent weight using the following formula: 50 IXR+308=EW.

IXR is used in this application to describe either hydrolyzed polymer which contains ion exchange groups or unhydrolyzed polymer which contains precursor groups which will subsequently be converted to the ion exchange groups during the manufacture of the membranes.

The highly fluorinated sulfonate polymer used in the process of the invention preferably has ion exchange ratio of about 8 to about 23, preferably about 9 to about 14 and most preferably about 10 to about 13.

Porous Support

The support used in the present invention is expanded polytetrafluoroethylene polymer (EPTFE) in one of two forms: (1) a porous microstructure which has nodes interconnected by polymeric fibrils (2) a porous microstructure comprised substantially of polymeric fibrils with no nodes present. Both forms of the EPTFE support are characterized by a high crystalline content of at least 85%, preferably at least 90%, more preferably at least 95% and most preferably at least 98%. Crystalline content can be measured by the method described by Moynihan, R. E., "IR Studies on Polytetrafluoroethylene", J. Am. Chem. Soc. 81, 1045–1050 (1959).

The preparation of the two forms of EPTFE support are described in U.S. Pat. No. 3,593,566 and U.S. Pat. No. 5,547,551 with the exception that in the present invention no heat treatment (or sintering step) is performed after extrusion and biaxially stretching. These prior art references both teach that extruded PTFE tape is heated to above its melting point (approximately 342° C.) while constrained after sequential longitudinal and transverse expansion.

Heat treating (or sintering) is performed to increase the amorphous content of the EPTFE to typically greater than 10%. According to the prior art teaching the amorphous regions within the crystalline structure inhibit slippage along the crystalline axis of the crystallite and lock the fibrils so that they resist slippage under stress. The heat treatment is considered as an amorphous locking process which increases the amorphous content of the polymer.

In contrast, the present invention uses a microporous support structure with a high crystalline content can be achieved by not sintering the EPTFE and thereby avoiding the introducing of amorphous regions into the structure. The microporous support of the present invention can be distinguished from the microporous structures described in the prior art by differential scanning calorimetry. The technique is described in *Thermal Characterization of Polymeric Materials*, E. A. Turi, ed., Academic Press, New York 1981, ch. 1,3. As is evident in Table 1, two commercial products (Sample I and Sample II) of EPTFE, when evaluated by differential scanning calorimetry, exhibit a reduction in melting point and a reduced crystallinity (magnitude of the endotherm) of the polymer when compared to unsintered Sample III. The 346° C. melting point and 81 J/g endotherm of unsintered EPTFE are characteristic of PTFE which has never been heated above its melting point. Sample II has two peaks and an intermediate crystallinity, indicating that it has been sintered to a lesser extent than Sample I.

TABLE 1

| Expanded PTFE | Endotherm peak temp. | Endotherm area (J/g) |
| --- | --- | --- |
| SAMPLE I Sintered | 336° C. | 54 |
| SAMPLE II Sintered | 332° C./345° C. | 69 |
| SAMPLE III Unsintered | 346° C. | 81 |

The heat treatment or sintering step described in U.S. Pat. No. 3,593,566 and U.S. Pat. No. 5,547,551 is credited with increasing the tensile strength of the EPTFE sheet. Surprisingly, however, applicants have discovered that the composite membrane in accordance with the present invention with support of expanded polytetrafluoroethylene which has not been sintered, exhibits greatly improved wet tear strength.

The composite membrane of the present invention preferably has a wet tear strength as determined by ASTM D1922 of at least about 10 kN/m, preferably of at least about 100 kN/m, most preferably of at least about 200 kN/m. Of particular interest is a composite membrane having a highly fluorinated ion exchange polymer and a porous support consisting essentially of expanded highly fluorinated nonionic polymer having a porous microstructure of polymeric fibrils. This membrane has a wet tear strength as determined by ASTM D1922 of at least about 10 kN/m preferably of at least about 100 kN/m, most preferably of at least 200 kN/m. "A porous support consisting essentially of expanded highly fluorinated nonionic polymer having a porous microstructure of polymeric fibrils" in the present application means that there is no other reinforcement associated with porous support such as fabrics, scrim, etc. and the tear strength is provided essentially only by the expanded highly fluorinated nonionic polymer having a porous microstructure of polymeric fibrils in combination with the ion exchange polymer in the membrane.

Composite membranes of the present invention are more robust in handling and may be converted or used in a number of manufacturing processes more easily.

Membrane Manufacture

The composite membrane of the present invention is formed by combining ion exchange polymer and EPTFE. This can be accomplished in a number of different ways. The composite can be made by impregnating the porous support with cation exchange polymer so that the coating is on the outside surfaces as well as being distributed through the internal pores of the support. The polymer may partially or completely fill the pores of the expanded support structure. This may be accomplished by impregnating the porous support with a solution or dispersion of the cation exchange polymer or cation exchange polymer precursor using a solvent or dispersion medium which is not harmful to the polymer of the support under the impregnation conditions. For example, for impregnating perfluorinated sulfonic acid polymer into a microporous EPTFE support, a 1–10 weight percent dispersion of the polymer in a polar solvent such as an alcohol/water mixture can be used. Impregnation can be performed using a variety of techniques including dipping, soaking, brushing, painting and spraying as well as using conventional coating methods such as forward roll coating, reverse roll coating, gravure coating, doctor coating, kiss coating, etc. After impregnation, the support with the solution/dispersion is dried to form the membrane. The impregnation and drying steps are repeated as needed to apply the desired amount of polymer.

In addition to impregnation, thin films of the ion exchange polymer can be laminated to one or both sides of the impregnated porous support. A number of techniques may be used including hot roll lamination, melt deposition of the polymer and numerous other methods taking care not to damage the integrity of the EPTFE support. The process used for making this laminate preferably causes sufficient adhesion between the porous support film that delamination does not occur during subsequent handling or processing including hydrolysis.

The composite membrane of present invention has a thickness of 20 $\mu$m to about 400 $\mu$m, preferably 30 $\mu$m to about 60 $\mu$m. Additionally, the composite membrane of the present invention may be reinforced with a woven or a nonwoven material or fabric bonded to one side of the composite membrane. Such structures have particular application in chloralkali processing. Suitable woven materials include scrims of woven fibers of EPTFE, webs of extruded or oriented fluoropolymer or fluoropolymer netting, and woven materials of fluoropolymer fiber. Suitable nonwoven materials include spun-bonded fluoropolymer.

For applications such as chloralkali membranes where it is desired for the composite membrane to have a layer of highly fluorinated carboxylate polymer, a bifilm of highly fluorinated sulfonyl halide polymer and highly fluorinated carboxylate polymer precursor can be prepared for subsequent lamination. Suitable highly fluorinated carboxylate polymers are disclosed in U.S. Pat. No. 4,552,631 (Bissot et al.). Preferably, the highly fluorinated carboxylate polymer precursor is highly fluorinated methyl carboxylate polymer. Most preferably, the carboxylate polymer is perfluorinated. The bifilm can be prepared by extrusion of each layer followed by lamination or by coextrusion of the component polymers to make a two layer film. The bilayer film is then laminated directly to the EPTFE or laminated to a composite membrane of the present invention with the sulfonyl fluoride side of the bilayer film contacting the composite membrane so that it is adjacent the highly fluorinated ion exchange polymer (e.g., sulfonyl fluoride). The bifilm may also be coextruded and directly deposited onto the EPTFE. The bifilm/composite membrane structure is preferably modified on the outer surface so as to have enhanced gas release properties as described in the teachings of U.S. Pat. No. 4,552,631 (Bissot et al.)

Of particular interest for use in fuel cells is a composite membrane of this invention in which is the EPTFE support structure is fully embedded in the ion exchange polymer so as to provide flat surfaces desired for contact with the electrodes. In such a composite membrane the nonionic polymer of porous support comprises less than about 15% by weight of the composite membrane. The fully embedded composite membrane may be formed by laminating, impregnating and/or coating the EPTFE. The fully embedded composite membrane of this invention preferably has a layer of unreinforced ion exchange polymer with a thickness of at least about 2 $\mu$m provided at each surface of the membrane and most preferably has at least about 5 $\mu$m provided at each surface of the membrane.

One preferred process for making the membranes using both film lamination and impregnation is described in the following paragraphs.

The process includes fabricating a layered membrane precursor including a porous support of expanded highly fluorinated nonionic polymer adhered to a layer of highly fluorinated sulfonyl halide polymer. This can be accomplished by a variety of methods including lamination, melt deposition and other methods.

A film of sulfonyl halide polymer such as sulfonyl fluoride polymer for lamination to the support is suitably made by extrusion at a temperature in the range of about 200° C. to about 300° C. Preferable film thicknesses are about 10 $\mu$m to about 250 $\mu$m. For applications such as chloralkali membranes where it is desired for the composite membrane to layer of highly fluorinated carboxylate polymer, a bifilm of a layer of highly fluorinated sulfonyl halide polymer and a layer highly fluorinated carboxylate polymer precursor can be coextruded for subsequent lamination or coextruded directly onto the porous support.

In a preferred form of the invention, the layered membrane precursor is fabricated under conditions so that sufficient flow of the highly fluorinated sulfonyl halide polymer occurs to form a consolidated layered membrane precursor which does not delaminate during subsequent hydrolysis. Preferably, this is accomplished by laminating the film of highly fluorinated sulfonyl halide polymer to the microporous support at a temperature of at least about 280° C., most preferably at a temperature of at least about 300° C. These temperatures provide thermoplastic flow of the polymer sufficient to form the preferred consolidated layered membrane precursor.

The lamination process is preferably performed under pressure. Pressures in the range of about 0.5 to about 1 atmosphere (about 50 kPa to about 100 kPa) have been found to be suitable. Such pressures are advantageously applied by subjecting the microporous support to a vacuum while keeping the sulfonyl halide polymer film side at atmospheric pressure. Depending on the temperature, contact times can be as little as 5 seconds but generally are less than 90 seconds to avoid overheating and degradation of the polymer.

In the process of the invention, the layered membrane precursor, with or without the additional carboxylate polymer precursor layer, is suitably hydrolyzed using methods known in the art. For example, the membrane may be hydrolyzed to convert it to the sodium sulfonate form by immersing it in 25% by weight NaOH for about 16 hours at a temperature of about 90° C. followed by rinsing the film twice in deionized 90° C. water using about 30 to about 60 minutes per rinse. Another possible method employs an aqueous solution of 6–20% of an alkali metal hydroxide and 5–40% polar organic solvent such as dimethyl sulfoxide with a contact time of at least 5 minutes at 50°–100° C. followed by rinsing for 10 minutes. The carboxylate polymer precursor, such as methyl carboxylate polymer, if present, is converted to carboxylate polymer at the same time. After hydrolyzing, the membrane precursor can be converted if desired to another ionic form by contacting the membrane in a bath containing a 1–5% salt solution containing the desired cation or, to the acid form, by contacting with a 2–20% aqueous acid solution and rinsing. For fuel cell use, the membrane is usually in the sulfonic acid form. For chloralkali membranes, the membrane precursor is typically used in the sodium form.

Impregnation of the microporous support of the hydrolyzed precursor laminate is performed with liquid composition of highly fluorinated sulfonic acid polymer or precursor thereof in a polar liquid medium. By "polar liquid medium" is meant liquids which can be transported by a highly fluorinated sulfonate membrane. Suitable compositions of sulfonic acid polymer in polar media are disclosed in U.S. Pat. Nos. 4,433,082 and 4,453,991 in which polymer particles are dispersed mixtures of water and alcohols. Preferably, the polar medium contains a high content of an alcohol which facilitates wetting of the microporous support and which is volatile to facilitate the removal of the liquid medium from the membrane. Most preferably, the liquid compositions contain at least about 90% of an alcohol selected from the group consisting of alcohols with 1 to 4 carbon atoms. A suitable concentration of polymer in the liquid medium is about 2 to about 10% by weight. Compositions with high alcohol contents can be made by concentrating the compositions as disclosed in U.S. Pat. Nos. 4,433,082 and 4,453,991 by evaporation and subsequent dilution with the desired alcohol.

Impregnation is performed so that the pores of the microporous support are at least partially filled, but preferably are completely filled with polymer. Most preferably, impregnation is performed so that the microporous support is embedded in the highly fluorinated sulfonate polymer, i.e., an unreinforced layer of the sulfonate polymer is present on both surfaces of the microporous support.

Impregnation can be carried out using a variety of methods such as dipping, soaking, brushing, painting and spraying as well as using conventional coating methods such as forward roll coating, reverse roll coating, gravure coating, doctor coating, kiss coating etc. In order to impregnate to the desired degree, repeated steps of impregnation and/or removal of the liquid medium (as discussed in more detail hereinafter) may be necessary.

Removal of the liquid medium can be accomplished by heating and the liquid medium can be recycled if desired. Preferably, during the impregnating of the microporous support, the side of the membrane with the highly fluorinated sulfonate polymer layer is contacted with a dry gas to cause at least partial removal of the polar liquid by passage through the layer of highly fluorinated sulfonate polymer. "Dry gas" as used herein is meant a gas which has a sufficiently low content of vapor of the polar liquid medium to cause removal of the medium from the membrane. The sulfonate polymer layer on the membrane thus serves to draw liquid composition into the microporous support and assists with the impregnation process. In addition, the ability to remove the liquid medium by transport through the membrane enables the process to be performed very quickly which is very helpful for continuous processes. One or a series of solvent removal stages can be employed depending on the dispersion application method and other process requirements.

It is preferable to coalesce the polymer impregnating the porous support. The polymer impregnating the porous support can be coalesced by heating to a temperature which renders the polymer insoluble. While the coalescence temperature varies with the IXR of the polymer, typically the membrane should be heated to above about 120° C. A preferred temperature range is about 120 to about 150° C. for compolymers of TFE and PDMOF in the normal IXR ranges employed. For other polymers and for higher IXR values, higher temperatures may be desirable. The time needed coalesce varies with the temperature employed a suitable range has been found to be about one minute to about one hour. Coalescence is conveniently carried out together with or immediately following the removal of the liquid medium if desired.

While the process of the invention can be performed to make discrete pieces of composite membrane, the invention is advantageously carried out by performing some or a number of the steps of the process in a continuous fashion using roll stock. In one preferred form of the process, steps needed to fabricate the layered membrane precursor are combined in to one stage using roll stock of the microporous support and laminating to sulfonyl halide or bifilm film roll stock or by extrusion deposition of the sulfonyl halide polymer, optionally coextruded with the carboxylate polymer precursor. The layer membrane precursor can be wound up using a roll wind-up if desired. Hydrolysis (and acid exchange if used) can be performed in a separate stage by feeding the roll of layered membrane precursor into a hydrolysis bath following by drying and winding up. Impregnation can be performed after hydrolysis in a continuous fashion if desired. Generally, however, it is more advantageous to perform the steps of impregnation, removal of the liquid medium and coalescence of the polymer together as a stage of the process.

The invention is illustrated in the following examples which are not intended to be limiting.

EXAMPLES

Example A

Composite Membrane with Sintered EPTFE

A sintered expanded PTFE structure (EPTFE), disclosed in U.S. Pat. Nos. 3,962,153 (Gore) and 3,953,566 (Gore), is used as a reinforcing layer in a composite membrane. The EPTFE has a nominal thickness of 0.004 inch (100 $\mu$m) and an apparent density of about 0.38 g/cc.

A 1 mil (0.001 inch, 25 $\mu$m) thick perfluorosulfonyl fluoride polymer film of 1080 equivalent weight is prepared by melt extrusion of the perfluorosulfonyl fluoride form of the polymer onto a rotating drum, the film then being conveyed and cowound on a steel core with polyethylene film as an interleaf to prevent self adhesion of the cast film. Extrusion temperature is approximately 275° C.

The 1 mil (0.001 inch, 25 $\mu$m) 1080 EW sulfonyl fluoride film is then laminated to the EPTFE structure by vacuum lamination using a vacuum roll at 250° C. aided by a horseshoe heater at 325° C. with a vacuum of 70 kPa to form a composite membrane.

A bifilm of 1 mil (0.001 inch, 25 $\mu$m) 1050 EW highly fluorinated carboxylate film adhered to 4 mil (0.004 inch, 102 $\mu$m) 1080 EW sulfonyl fluoride film is prepared by extrusion and lamination of the component films, or by coextrusion of the component polymers to make a two layer film. The bifilm is then laminated to the composite membrane prepared above with the sulfonyl fluoride side of the bifilm contacting the sulfonyl fluoride side of the composite using conditions similar to those used to laminate the 1 mil (0.001 inch, 25 $\mu$m) sulfonyl fluoride film to the EPTFE structure.

Squares, 5 inch (127 mm) on each side, of the bifilm/composite membrane laminate are then cut from the roll stock. The EPTFE side of bifilm/composite membrane laminate is treated with a liquid composition of 5% 922 EW hydrolyzed perfluorosulfonic acid polymer (as described in DuPont U.K. patent 1,286,589) in a 5% water/95% ethyl alcohol mixture by pouring the solution onto the square and rubbing it in until the membrane becomes translucent and allowing the laminate to air dry between treatments. The coating cycle is repeated until the membrane retains its clear appearance in the dry state, visually indicating complete filling of the pores of the EPTFE layer with ionomer. A total of 4 coating cycles are required to accomplish this. The bifilm/composite membrane laminate is dried for a period of several days at a temperature of 110° C. to remove residual solvent and to fully consolidate the laminate.

The bifilm composite/membrane laminate is then exposed to a solution of 10% potassium hydroxide, 30% dimethyl sulfoxide and 60% water on a steam bath for 30 minutes to hydrolyze the laminate to the potassium salt form, and washed thoroughly in deionized water.

The hydrolyzed laminate still in the wet condition was tested for tear strength using 3 inch (76 mm) squares. The tear test is Elmendorf Tear, ASTM D1922.

The tear strength is 2 kN/m, about the same strength as unreinforced membrane. Commercial lightly reinforced membrane has a typical wet tear strength of 30 kN/m.

Example 1
Composite Membrane with Unsintered EPTFE

An unsintered expanded PTFE structure (EPTFE), prepared as disclosed in U.S. Pat. Nos. 3,962,153 (Gore) and 3,953,566 (Gore) omitting the sintering step, is used as a reinforcing layer in a composite membrane. The EPTFE has a nominal thickness of 4 mil (0.004 inch, 102 $\mu$m) and an apparent density of about 0.38 g/cc with a pore size of 0.2 $\mu$m.

Squares, 5 inch (127 mm) on each side, of the EPTFE are soaked with a liquid composition of 5% 922 EW hydrolyzed perfluorosulfonic acid polymer (as described in DuPont U.K. patent 1,286,589) in a 5% water/95% ethyl alcohol mixture, followed by air drying, until the membrane becomes translucent visually indicating complete filling or the pores of the EPTFE with ionomer. A total of 4 coating cycles are required to accomplish this. The impregnated EPTFE membrane is air dried and is then exposed to a solution of 10% potassium hydroxide, 30% dimethyl sulfoxide and 60% water on a steam bath for 30 minutes to hydrolyze the membrane to the potassium salt form, and washed thoroughly in deionized water.

The hydrolyzed membrane still in the wet condition was tested for using tear strength ASTM D1922 using 3 inch (76 mm) squares The tear strength was 160 kN/m.

Composite membranes made with unsintered EPTFE have a much superior tear strength to composite membranes made with sintered EPTFE.

Example 2
Composite Membrane for Chloralkali Electrolysis

An unsintered expanded microporous PTFE support (EPTFE), prepared as disclosed in U.S. Pat. Nos. 3,962,153 (Gore) and 3,953,566 (Gore) omitting the sintering step, is used as a microporous support in a composite membrane. The EPTFE has a nominal thickness of 4 mil (100 $\mu$m) and an apparent density of about 0.38 g/cc with a pore size of 0.2 $\mu$m.

A bifilm of 1 mil (25 $\mu$m) 1050 EW highly fluorinated carboxylate film adhered to 4 mil (0.004 inch, 100 $\mu$m) 1080 EW sulfonyl fluoride film is prepared by coextrusion of the component polymers to make a two layer film. The bifilm is then laminated to the microporous EPTFE support by vacuum lamination at 280° C. with the sulfonyl fluoride side of the bifilm contacting the support.

Squares, 5 inch (127 mm) on each side, of the bifilm laminate are then cut from the roll stock. The bifilm laminate is exposed to a solution of 10 weight % potassium hydroxide, 30 weight % dimethyl sulfoxide and 60 weight % water on a steam bath for 30 minutes to hydrolyze the laminate to the potassium salt form, and washed thoroughly in deionized water.

The EPTFE support side of the laminate is then sprayed several times with a liquid composition of 5 weight % perfluorosulfonic acid polymer (copolymer of TFE and PDMOF) having an equivalent weight of 922 (12 IXR) in a 5 weight % water/95 weight % ethyl alcohol mixture, followed by drying, until the membrane becomes translucent and allowing the laminate to air dry between treatments. The coating cycle is repeated until the membrane retains its clear appearance in the dry state, visually indicating complete filling of the pores of the EPTFE layer with ionomer. A total of 4 coating cycles are required to accomplish this. The bifilm laminate is dried for a period of several days at a temperature of 110° C. to remove residual solvent and to fully consolidate the laminate and form a composite membrane suitable for testing electrical performance.

The membrane is then coated on both sides with gas release coating according to the teachings of U.S. Pat. No. 4,552,631 (Bissot et al.) and put into chloralkali cells for testing.

After 94 days continuous cell testing duplicate membranes show 3.04V, 95.3% current efficiency and 3.07V, 96.4% current efficiency. This performance is equivalent to that of good commercial membranes.

What is claimed is:

1. A composite membrane comprising an ion exchange polymer and a support of expanded polytetrafluoroethylene polymer having a porous microstructure of polymeric fibrils, said expanded polytetrafluoroethylene polymer being at least about 85% crystalline.

2. The composite membrane of claim 1 wherein said expanded polytetrafluoroethylene polymer is at least about 90% crystalline.

3. The composite membrane of claim 1 wherein said expanded polytetrafluoroethylene polymer is at least about 95% crystalline.

4. The composite membrane of claim 1 wherein said expanded polytetrafluoroethylene polymer is at least about 98% crystalline.

5. The composite membrane of claim 1 wherein said expanded polytetrafluoroethylene polymer has a microstructure of nodes interconnected by fibrils.

6. The composite membrane of claim 1 where the ion exchange polymer is highly fluorinated.

7. The composite membrane of claim 6 wherein said membrane has a wet tear strength as determined by ASTM D1922 of at least about 10 kN/m.

8. The composite membrane of claim 6 wherein said membrane has a wet tear strength as determined by ASTM D1922 of at least about 100 kN/m.

9. The composite membrane of claim 6 wherein said membrane has a wet tear strength as determined by ASTM D1922 of at least about 200 kN/m.

10. The composite membrane of claim 6 wherein said ion exchange polymer has an ion exchange ratio of about 8 to about 23.

11. The composite membrane of claim 6 wherein said ion exchange polymer has an ion exchange ratio of about 9 to about 14.

12. The composite membrane of claim 6 wherein said ion exchange polymer has an ion exchange ratio of about 10 to about 13.

13. The composite membrane of claim 6 wherein said ion exchange polymer has sulfonate ion exchange groups.

14. The composite membranes of claim 13 wherein said ion exchange polymer is perfluorinated.

15. The composite membrane of claim 14 further comprising a layer of highly fluorinated carboxylate polymer.

16. The composite membrane of claim 14 further comprising an unreinforced layer of sulfonate polymer adjacent to said porous support and a layer of highly fluorinated carboxylate polymer adhered to the side of said sulfonate polymer layer remote from said porous support.

17. The composite membrane of claim 1 having a thickness of 20 μm to about 400 μm.

18. The composite membrane of claim 1 having a thickness of 30 μm to about 60 μm.

19. The composite membrane of claim 1 further comprising a fabric attached to said porous support.

20. The composite membrane of claim 19 wherein the fabric is woven.

21. The composite membrane of claim 19 wherein the fabric is nonwoven.

22. The composite membrane of claim 1 wherein said porous support is fully embedded in said ion exchange polymer.

23. The composite membrane of claim 22 wherein said polymer of porous support comprises less than about 15% by weight of said membrane.

24. The composite membrane of claim 22 wherein a layer of unreinforced ion exchange polymer having a thickness of at least about 2 μm is provided at each surface of said membrane.

25. The composite membrane of claim 22 wherein a layer of unreinforced ion exchange polymer having a thickness of at least about 5 μm is provided at each surface of said membrane.

26. The composite membrane of claim 25 wherein said membrane has a wet tear strength as determined by ASTM D1922 of at least about 200 kN/m.

27. The composite membrane of claim 25 wherein said membrane has a wet tear strength as determined by ASTM D1922 of at least about 100 kN/m.

28. A composite membrane comprising a highly fluorinated ion exchange polymer and a porous support consisting essentially of expanded highly fluorinated nonionic polymer having a porous microstructure of polymeric fibrils, said membrane having a wet tear strength as determined by ASTM D1922 of at least about 10 kN/m.

29. An electrochemical cell comprising an anode and a cathode partitioned by a composite membrane comprising an ion exchange polymer and a support of expanded polytetrafluoroethylene polymer having a porous microstructure of polymeric fibrils, said expanded polytetrafluoroethylene polymer being at least about 85% crystalline.

30. A fuel cell comprising an anode and a cathode partitioned by a composite membrane comprising an ion exchange polymer and a support of expanded polytetrafluoroethylene polymer having a porous microstructure of polymeric fibrils said expanded polytetrafluoroethylene polymer being at least about 85% crystalline.

31. An electrochemical cell for producing an alkali metal hydroxide and chlorine by the electrolytic conversion of an alkali metal chloride, said cell comprising an anode and a cathode partitioned by a composite membrane comprising an ion exchange polymer and a support of expanded polytetrafluoroethylene polymer having a porous microstructure of polymeric fibrils, said expanded polytetrafluoroethylene polymer being at least about 85% crystalline.

* * * * *